United States Patent
Yan et al.

(10) Patent No.: US 9,491,100 B2
(45) Date of Patent: Nov. 8, 2016

(54) METHOD AND DEVICE FOR UPDATING ROUTING LOOKUP TREE

(71) Applicant: ZTE Corporation, Shenzhen, Guangdong (CN)

(72) Inventors: Zhenlin Yan, Shenzhen (CN); Zhihai Hu, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 0 days.

(21) Appl. No.: 14/436,539

(22) PCT Filed: Oct. 9, 2013

(86) PCT No.: PCT/CN2013/084922
§ 371 (c)(1),
(2) Date: Apr. 17, 2015

(87) PCT Pub. No.: WO2014/059889
PCT Pub. Date: Apr. 24, 2014

(65) Prior Publication Data
US 2015/0288605 A1    Oct. 8, 2015

(30) Foreign Application Priority Data
Oct. 17, 2012    (CN) .......................... 2012 1 0395132

(51) Int. Cl.
| | | |
|---|---|---|
| *H04L 12/741* | (2013.01) | |
| *H04L 12/721* | (2013.01) | |
| *H04L 12/751* | (2013.01) | |
| *H04L 12/28* | (2006.01) | |

(52) U.S. Cl.
CPC .............. *H04L 45/745* (2013.01); *H04L 45/02* (2013.01); *H04L 45/566* (2013.01)

(58) Field of Classification Search
CPC ..... H04L 45/54; H04L 45/742; H04L 45/00; H04L 45/02
USPC ........................................ 370/401, 408, 392
See application file for complete search history.

(56) References Cited

U.S. PATENT DOCUMENTS

2003/0225907 A1*  12/2003  Krishnan ................ H04L 45/00
                                                           709/238
2008/0080539 A1*   4/2008  Hong ................... H04L 45/7453
                                                           370/402

(Continued)

FOREIGN PATENT DOCUMENTS

| CN | 1585358 A | 2/2005 |
|---|---|---|
| CN | 101102272 A | 1/2008 |

(Continued)

OTHER PUBLICATIONS

Supplementary European Search Report in European application No. 13846592.7, mailed on Aug. 21, 2015.

(Continued)

*Primary Examiner* — Charles C Jiang
*Assistant Examiner* — Will Lin
(74) *Attorney, Agent, or Firm* — Oppendahl Patent Law Firm LLC (57) ABSTRACT

A method and device for updating a routing lookup tree are provided. When it is determined that a routing lookup tree needs to be updated, a layer update indication table and node update information are determined according to updated entries; a layer is selected from the routing lookup tree as a current layer in sequence according to levels of layers, and if it is determined that the current layer needs to be updated according to the layer update indication table, the previous layer of the current layer in the routing lookup tree is locked, the node update information is synchronized to the current layer in the routing lookup tree, and so on, until it is determined that the current layer is the last layer needing to be updated according to the layer update indication table, and then this update of the routing lookup tree is ended. The method and device can reduce the time of blocking lookup when a routing lookup tree is updated, and avoid packet error or packet loss caused due to simultaneous update and lookup.

11 Claims, 2 Drawing Sheets

(56) References Cited

U.S. PATENT DOCUMENTS

| | | | |
|---|---|---|---|
| 2008/0107043 A1* | 5/2008 | Smith | H04L 45/02 370/255 |
| 2010/0172270 A1 | 7/2010 | Smith | |
| 2011/0099262 A1* | 4/2011 | Wang | H04L 12/56 709/223 |
| 2012/0207061 A1 | 8/2012 | Smith | |
| 2014/0153579 A1 | 6/2014 | Ashwood Smith et al. | |

FOREIGN PATENT DOCUMENTS

| | | | |
|---|---|---|---|
| CN | 101483610 A | 7/2009 |
| EP | 2187576 A1 | 5/2010 |
| WO | 02052442 A1 | 7/2002 |
| WO | 2008052341 A1 | 5/2008 |

OTHER PUBLICATIONS

International Search Report in international application No. PCT/CN2013/084922, mailed on Jan. 9, 2014.

English Translation of the Written Opinion of the International Search Authority in international application No. PCT/CN2013/084922, mailed on Jan. 9, 2014.

* cited by examiner

Delete a node whose key value is 12

Fig. 4

METHOD AND DEVICE FOR UPDATING ROUTING LOOKUP TREE

TECHNICAL FIELD

The disclosure relates to the routing management technology of a Network Processor (NP), and in particular to a method and device for updating a routing lookup tree.

BACKGROUND

The NP is a programmable chip for network data message processing, which has low price and high flexibility like a general processor, and has high performance and extendibility like an Application Specific Integrated Circuit (ASIC), and is regarded as the core technology of the next generation network development.

To meet the requirement of high-speed lookup, the method of updating a routing table in the NP have been presented in recent years, one is locking routing lookup, table by only software is not applicable any more. Two methods for updating a routing namely stopping lookup before updating a routing table, and restarting the routing lookup until an update of router is completed, however, since the time of locking is long, such method causes longer time of lookup blocking; another method is updating entries during routing lookup, however, such method will cause a conflict between lookup and update of an access entry memory, and result in packet error or packet loss during lookup.

Thus, the methods for updating a routing table in the NP in the prior art causes either long time of lookup blocking or packet error or packet loss.

SUMMARY

In view of this, the disclosure is intended to provide a method and device for updating a routing lookup tree, which can reduce the time of blocking lookup when a routing lookup tree is updated, and avoid packet error or packet loss caused due to simultaneously executed update and lookup.

To this end, the technical solutions of the disclosure are implemented as follows.

An embodiment of the disclosure provides a method for updating a routing lookup tree, including:

determining a layer update indication table and node update information according to updated entries, when it is determined that a routing lookup tree needs to be updated; and selecting in sequence a layer from the routing lookup tree as a current layer according to levels of layers, and if it is determined that the current layer needs to be updated according to the layer update indication table, then locking a previous layer of the current layer in the routing lookup tree, synchronizing the node update information to the current layer in the routing lookup tree, and so on, until it is determined that the current layer is a last layer needing to be updated according to the layer update indication table, and then ending the update of the routing lookup tree.

In the above solution, determining the layer update indication table and the node update information according to the updated entries may include:

calculating to obtain a new routing lookup table according to routing entries to be updated;

obtaining the layer update indication table and the node update information according to the new routing lookup table.

In the above solution, obtaining the layer update indication table and the node update information according to the new routing lookup table may include:

comparing the new routing lookup table with an original routing lookup table saved in the NP, and checking each layer in sequence to judge whether a node is needed to be added to or deleted from a layer; if needed, then setting an update layer level mark of the layer as 1 at a corresponding location of the layer update indication table, and writing node information modified in the layer as the node update information; if not needed, then setting the update layer level mark of the layer as 0 at a corresponding location of the layer update indication table, until obtaining the layer update indication table composed of update layer level marks of all the layers.

In the above solution, locking the previous layer of the current layer in the routing lookup tree, and synchronizing the node update information to the current layer in the routing lookup tree may include:

after locking the previous layer of the current layer, judging whether on-going lookup has been completed in the current layer; if completed, then updating a node needing to be updated in the current layer according to an updated node table; if not completed, then continuing judging whether the on-going lookup has been completed in the current layer.

In the above solution, determining that the current layer is the last layer needing to be updated may include:

judging whether the current layer is the last layer needing to be updated according to the layer update indication table; if the current layer is the last layer, then ending the processing flow;

if the current layer is not the last layer, then starting judging from the current layer whether there is any layer needing to be updated according to the layer update indication table; if there is a layer needing to be updated, then locking the previous layer of the current layer in the routing lookup tree, and synchronizing the node update information to the current layer; if there is no layer needing to be updated, then continuing judging whether the current layer is the last layer needing to be updated according to the layer update indication table.

Another embodiment of the disclosure provides a device for updating a routing lookup tree, including a software algorithm module, an update control module and a lookup module; wherein, the software algorithm module is configured to, when determining that the routing lookup tree needs to be updated, determine the layer update indication table and the node update information according to the updated entries, and to send the layer update indication table and the node update information to the update control module;

the update control module is configured to select in sequence, according to the layer update indication table sent from the software algorithm module, a layer from the routing lookup tree as a current layer according to levels of layers in the lookup module; if determining that the current layer needs to be updated according to the layer update indication table, then to notify the lookup module to lock a previous layer of the current layer in the routing lookup tree, to send the node update information to the lookup module, and so on, until determining that the current layer is a last layer needing to be updated according to the layer update indication table, and then ending the update of the routing lookup tree;

the lookup module is configured to receive the notification from the update control module to lock the previous layer of the current layer, and synchronize the node update information sent from the update control module to the current layer in the routing lookup tree.

In the above solution, the software algorithm module may be configured to, calculate to obtain a new routing lookup table according to routing entries to be updated, and to obtain the layer update indication table and the node update information according to the new routing lookup table.

In the above solution, the software algorithm module may be configured to compare the new routing lookup table with an original routing lookup table saved in the NP, and check each layer in sequence to judge whether a node is needed to be added to or deleted from a layer; if needed, then to set an update layer level mark of the layer as 1 at a corresponding location of the layer update indication table, and write node information modified in the layer as the node update information; if not needed, then to set the update layer level mark of the layer as 0 at a corresponding location of the layer update indication table, until obtaining the layer update indication table composed of update layer level marks of all the layers.

In the above solution, the update control module may be configured to, after locking the previous layer of the current layer, judge whether the on-going lookup has been completed in the current layer; if completed, then to update the node needing to be updated in the current layer according to an updated node table; if not completed, then to continue judging whether the on-going lookup has been completed in the current layer.

In the above solution, the update control module may be configured to judge whether the current layer is the last layer needing to be updated according to the layer update indication table; if the current layer is the last layer, then to end operation; if the current layer is not the last layer, then to start judging from the current layer whether there is any layer needing to be updated according to the layer update indication table; if there is a layer needing to be updated, then to lock the previous layer of the current layer in the routing lookup tree, and to synchronize the node update information to the current layer; if there is no layer needing to be updated, then to continue judging whether the current layer is the last layer needing to be updated according to the layer update indication table.

The disclosure provides a method and device for updating a routing lookup tree, which can select in sequence a layer from the routing lookup tree as a current layer according to levels of layers; if it is determined that the current layer needs to be updated according to the layer update indication table, then the previous layer of the current layer is locked in the routing lookup tree, and the node update information is synchronized to the current layer in the routing lookup tree. Thus, when lookup has to be stopped because of routing lookup tree update, blocking lookup will not take long time. Moreover, the current update layer can be locked while the routing lookup tree is updated, thereby avoiding packet error or packet loss caused due to simultaneous update and lookup.

DETAILED DESCRIPTION

The basic idea of the disclosure is that when it is determined that a routing lookup tree needs to be updated, a layer update indication table and node update information are determined according to updated entries; a layer is selected in sequence from the routing lookup tree as a current layer according to levels of layers, and if it is determined that the current layer needs to be updated according to the layer update indication table, the previous layer of the current layer in the routing lookup tree is locked, the node update information is synchronized to the current layer in the routing lookup tree, and so on, until it is determined that the current layer is the last layer needing to be updated according to the layer update indication table, and then this update of the routing lookup tree is ended.

The disclosure is further elaborated below in combination with the accompanying drawings and embodiments.

Figure 1:
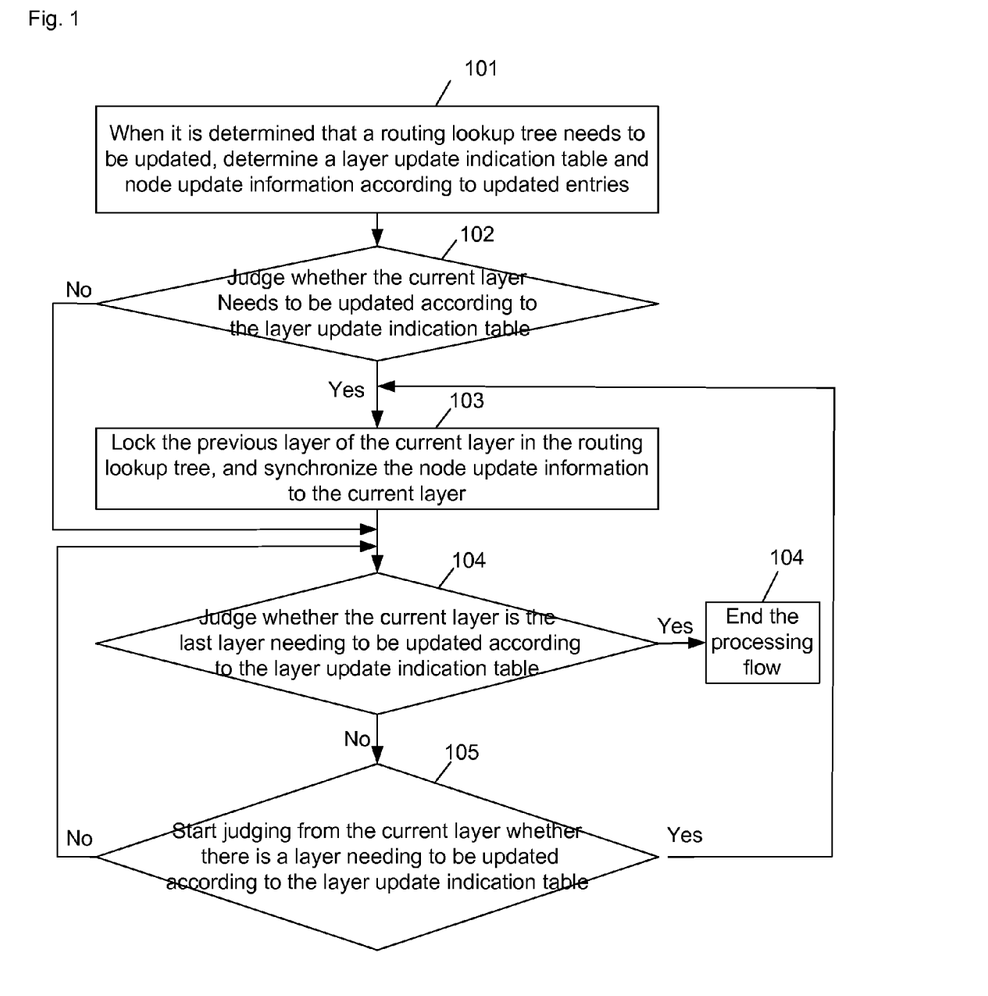
FIG. 1 is a flowchart of a method for updating a routing lookup tree according to an embodiment of the disclosure.

As shown in FIG. 1, the method for updating a routing lookup tree provided by an embodiment of the disclosure includes the following steps.

Step 101 includes that when it is determined that a routing lookup tree needs to be updated, layer update indication table and node update information are determined according to the updated entries.

Here, determining the layer update indication table and the node update information according to the updated entries may include calculating to obtain a new routing lookup table according to routing entries to be updated, and obtaining the layer update indication table and the node update information according to the new routing lookup table.

Determining that the routing lookup tree needs to be updated is that when it is detected that a target IP address in an IP data packet is not in the current routing table, it is determined that the routing lookup tree needs to be updated; or, when it is detected that there is an entry ageing in the current routing table, it is determined that the routing lookup tree needs to be updated.

Detecting that the target IP address in the IP data packet is not in the current routing table may include extracting the target IP address from the IP data packet, calculating to obtain a key value of the target IP address, and taking this key value as a lookup key value to search the current routing lookup table; if a node prefix is the same as the lookup key value, then no longer performing lookup, obtaining from the node information a storage address where a result entry is, and sending the IP data packet after obtaining a next-hop IP address from the store address;

if the matching node prefix is not found after the lookup in the routing lookup table is completed, then it is determined that the target IP address in the IP data packet is not in the current routing table.

Detecting that there is an entry ageing in the current routing table belongs to the prior art, which may include: recording in real time the target IP address and the next-hop IP address found each time, and periodically comparing them with each entry in the routing table; if there is an entry not used for a length of time exceeding a preset ageing time limit in the routing table, then determining that the entry is ageing, wherein the periodicity is a length of time preset based on the actual situation, and the ageing time limit is a length of time preset based on the actual situation.

Calculating to obtain the new routing lookup table according to the routing entries to be updated may include that, when it is detected that the target IP address in the IP data packet is not in the current routing table, the target IP address and the next-hop IP address in the IP data packet are saved as result table entries; an address pointer, a pointer pointing at a child node, a prefix character, a prefix vector and a key value which are saved in the result entry are taken as the node information, and a new routing lookup table is obtained after calculation and adjustment according to the node information; or, when it is detected that there is an entry needing to be deleted in the current routing table, the routing lookup table is searched for the node according to the target IP address in the entry and then deleted, and a new routing lookup table is obtained after calculation and adjustment according to the deleted node.

Figure 2:
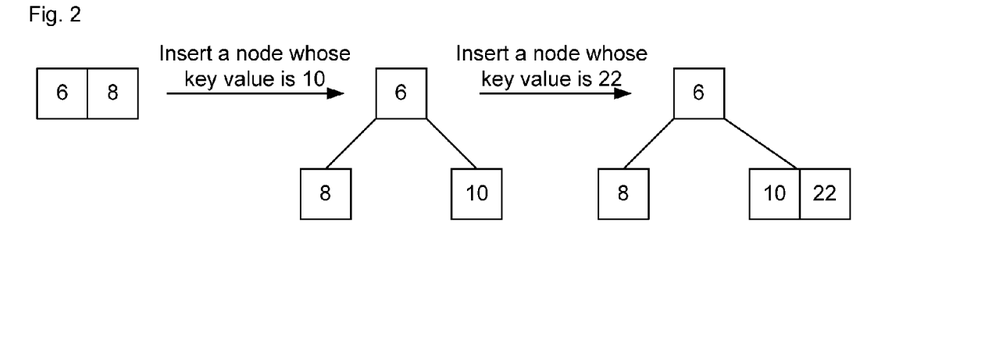
FIG. 2 is a process diagram of adding a node using an improved B-Tree algorithm provided by an embodiment of the disclosure.

The calculation may adopt an improved B-Tree algorithm, which includes that by means of prefix compression, all the prefixes in the routing lookup table and all father prefixes of these prefixes are compressed on one child node through prefix vector, wherein the prefix vector is used for representing the number of prefixes included in each node. As shown in FIG. 2, adding the node to the routing lookup table may include that root nodes are the node whose key value is 6 and the node whose key value is 8; when the node whose key value is 10 is inserted, the root nodes are split, the node whose key value is 8 is taken as the father node, the node whose key value is 6 is taken as the left brother, and the node whose key value is 10 is taken as the right brother; when the node whose key value is 22 is inserted, if its key value is greater than the key value of the root node by comparison, and if its key value is greater than 10 after being compared with the node whose key value is 10, then the node whose key value is 22 is placed on the right of the node whose key value is 10, and so on.

Figure 3:
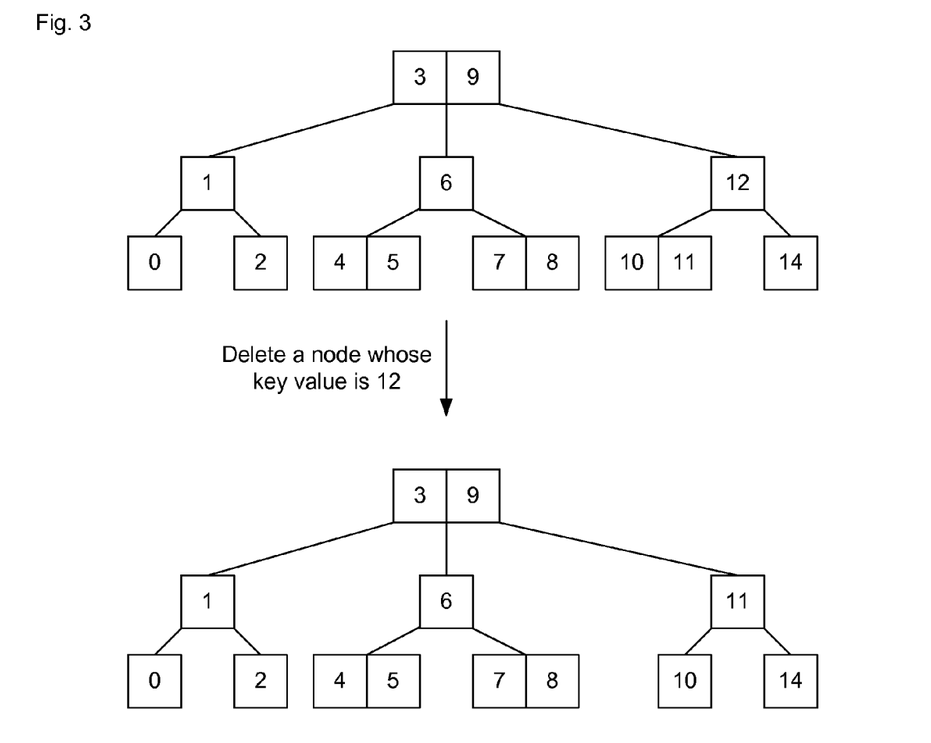
FIG. 3 is a process diagram of deleting a node using an improved B-Tree algorithm provided by an embodiment of the disclosure.

As shown in FIG. 3, searching the routing lookup table for the node and deleting the node may include that supposing that the node whose key value is 12 is to be deleted, first the whole tree is searched starting from the root node, and the node is then deleted after the node is found; and space left by the deleted node is filled with the left node (e.g., the node whose key value is 11 shown in FIG. 3) in the child nodes.

Obtaining the layer update indication table and the node update information according to the new routing lookup table may include that the new routing lookup table is compared with the original routing lookup table saved in the NP, and each layer is checked in sequence to judge whether a node is needed to be added to or deleted inform a layer; if needed, then the update layer level mark of this layer is set as 1 at the corresponding location of the layer update indication table, and node information modified in this layer is wrote as the node update information; if not needed, the update layer level mark of this layer is set as 0 at the corresponding location of the layer update indication table, until the layer update indication table composed of the update layer level marks of all the layers is obtained.

The length of the layer update indication table is the same as the layer levels included in a binary tree structure; the corresponding location of the layer update indication table is that the record table from left to right represents a root node layer to leaf node layers in sequence.

Step 102 includes that starting from the first layer, layers in the routing lookup tree are selected as current layers in sequence, and it is judged whether the current layer needs to be updated according to the layer update indication table; if needing, Step 103 is executed; or else, Step 104 is executed.

Here, the judgment includes that update layer level marks are extracted, starting from the first place of the layer update indication table; if a update layer level mark is 1, then it is determined that the layer corresponding to the update layer level mark needs to be updated; or else, it is determined that the layer does not need to be updated.

Step 103 includes that the previous layer of the current layer in the routing lookup tree is locked, and the node update information is synchronized to the current layer.

Specifically, after the previous layer of the current layer is locked, it is judged whether the on-going lookup has been completed in the current layer; if completed, the node needing to be updated in the current layer is updated according to the updated node table; or else, judging whether the on-going lookup has been completed in the current layer is continued.

Here, locking means stopping the previous layer from sending a lookup key value to the current layer; wherein, sending a lookup key value belongs to the prior art, so it will not be repeated here;

Judging whether the on-going lookup has been completed in the current layer can be that after the previous layer of the current layer is locked, a timer is started; when the timer times out, it is determined that the on-going lookup has been completed in the current layer.

Step 104 includes that it is judged whether the current layer is the last layer needing to be updated according to the layer update indication table; if the current layer is the last layer, the processing flow is ended; or else, Step 105 is executed.

Step 105 includes that it is started from the current layer to judge whether there is a layer needing to be updated according to the layer update indication table; if needed, Step 103 is executed; or else, Step 104 is executed.

Furthermore, after the above flow is completed, normal routing lookup of a data packet can be recovered, and this operation belongs to the prior art, so it will not be repeated here.

Figure 4:
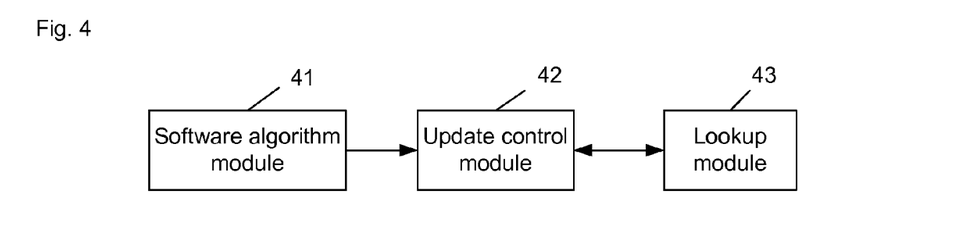
FIG. 4 is a structural diagram of a device for updating a routing lookup tree according to an embodiment of the disclosure.

As shown in FIG. 4, an embodiment of the disclosure provides a device for updating a routing lookup tree; the device may include a software algorithm module 41, an update control module 42 and a lookup module 43; wherein the software algorithm module 41 is configured to, when determining that a routing lookup tree needs to be updated, determine a layer update indication table and node update information according to updated entries, and to send the layer update indication table and the node update information to the update control module 42;

the update control module 42 is configured to select in sequence, according to the layer update indication table sent from the software algorithm module 41, a layer from the routing lookup tree as a current layer according to levels of layers in the lookup module 43; if determining that the current layer needs to be updated according to the layer update indication table, to notify the lookup module 43 to lock the previous layer of the current layer in the routing lookup tree, to send the node update information to the lookup module 43, and so on, until determining that the current layer is a last layer needing to be updated according to the layer update indication table, and then ending the update of the routing lookup tree; and the lookup module 43 is configured to receive the notification from the update control module 42 to lock the previous layer of the current layer, and to synchronize the node update information sent from the update control module 42 to the current layer in the routing lookup tree.

The software algorithm module 41 may be further configured to, according to routing entries to be updated, calculate to obtain a new routing lookup table, and to obtain the layer update indication table and the node update information according to the new routing lookup table.

The software algorithm module 41 may be further configured to, when it is detected that the target IP address in the IP data packet is not in the current routing table, determine that the routing lookup tree needs to be updated; or, the software algorithm module may be configured to, when it is detected that there is an entry ageing in the current routing table, determine that the routing lookup tree needs to be updated.

The software algorithm module 41 may be further configured to extract a target IP address from the IP data packet, calculate to obtain the key value of the target IP address, and take this key value as a lookup key value to search in the current routing lookup table; if a node prefix is the same as the lookup key value, to not perform lookup any more, and to obtain from the node information a storage address where the result entry is, and to send the IP data packet after obtaining a next-hop IP address from the storage address; if a matching node prefix is not found after completing lookup of the routing lookup table, to determine that the target IP address in the IP data packet is not in the current routing table.

The software algorithm module 41 may be configured to record in real time the target IP address and the next-hop IP address looked up each time, and periodically compare them with each entry in the routing table; the software algorithm module may be configured to, if there is an entry not used for a length of time exceeding a preset ageing time limit in the routing table, to age the entry, namely delete the entry; wherein the periodicity is a length of time preset based on the actual situation, and the ageing time limit is a length of time preset based on the actual situation.

The software algorithm module 41 may be configured to, when it is detected that the target IP address in the IP data packet is not in the current routing table, save the target IP address and the next-hop IP address in the IP data packet as result table entries, to take an address pointer, a pointer pointing at a child node, a prefix character, a prefix vector and the key value which are saved in the result entry as the node information, and to calculate and adjust to obtain the new routing lookup table according to the node information; or, the software algorithm module is configured to, when it is detected that there is an entry needing to be deleted from the current routing table, search the routing lookup table for a node according to the target IP address in the entry and delete the node, and to calculate and adjust to obtain the new routing lookup table according to the deleted node.

The calculation may adopt the improved B-Tree algorithm, which includes that, by means of prefix compression, all the prefixes in the routing lookup table and all father prefixes of these prefixes are compressed to a child node through the prefix vector, wherein the prefix vector is used for representing the number of prefixes included in each node. As shown in FIG. 2, adding the node to the routing lookup table may include that root nodes are the node whose key value is 6 and the node whose key value is 8; when the node whose key value is 10 is inserted, the root nodes are split, the node whose key value is 8 is taken as the father node, the node whose key value is 6 is taken as the left brother, and the node whose key value is 10 is taken as the right brother; when the node whose key value is 22 is inserted, if its key value is greater than the key value of the root node by comparison, and if its key value is greater than 10 after being compared with the node whose key value is 10, then the node whose key value is 22 is on the right of the node whose key value is 10, and so on.

As shown in FIG. 3, searching the routing lookup table for the node and deleting the node may include that supposing that the node whose key value is 12 is to be deleted, the whole tree is searched starting from the root node first, and the node is deleted after found; and space left by the deleted node is filled with the left node (e.g., the node whose key value is 11 shown in FIG. 3) in the child nodes.

The software algorithm module 41 may be configured to compare the new routing lookup table with the original routing lookup table saved in the NP, and to check each layer in sequence to judge whether a node is needed to be added to or deleted from a layer, if needed, then to set the update layer level mark of the layer as 1 at the corresponding location of the layer update indication table, and write the node information modified in the layer as the node update information; if not needed, then to set the update layer level mark of the layer as 0 at the corresponding location of the layer update indication table, until the layer update indication table composed of the update layer level marks of all the layers is obtained. The length of the layer update indication table is the same as the layer levels included in a binary tree structure; the corresponding location of the layer update indication table is that the record table left to right represents a root node layer to leaf node layers in sequence.

The update control module 42 may be configured to select layers as the current layers in sequence starting from the first layer in the routing lookup tree of the lookup module 43, and to judge whether a current layer needs to be updated according to the layer update indication table; the update control module is further configured to, if the current layer needs to be updated, lock the previous layer of the current layer in the routing lookup tree of the lookup module 43, and synchronize the node update information to the current layer; if the current layer does not need to be updated, to judge whether the current layer is the last layer needing to be updated according to the layer update indication table.

The update control module 42 may be configured to extract update layer level marks starting from the first place of the layer update indication table; if a update layer level mark is 1, then to determine that the layer corresponding to the update layer level mark needs to be updated; or else, to determine that the layer does not need to be updated.

The update control module 42 may be configured to, after locking the previous layer of the current layer, judge whether the on-going lookup has been completed in the current layer; if completed, then to update a node needing to be updated in the current layer according to the updated node table; or else, to continue judging whether the on-going lookup is completed in the current layer.

The update control module 42 may be configured to notify the lookup module 43 to stop the previous layer of the current layer from sending the lookup key value to the current layer; correspondingly, the lookup module 43 may be configured to stop the previous layer of the current layer from sending the lookup key value to the current layer according to the notification from the update control module 42.

The update control module 42 is configured to, after locking the previous layer of the current layer, start a timer, and when the timer times out, to determine that the on-going lookup has been completed in the current layer.

The update control module 42 may be configured to judge whether the current layer is the last layer needing to be updated according to the layer update indication table; if the current layer is the last layer, then to end the processing flow, or else, to start judging from the current layer whether there is a layer needing to be updated according to the layer update indication table; if there is a layer needing to be updated, then to lock the previous layer of the current layer in the routing lookup tree of the lookup module 43, and synchronize the node update information to the current layer, or else, to continue judging whether the current layer is the last layer needing to be updated according to the layer update indication table.

The lookup module 43 may save the node information corresponding to each layer by saving the node information of this layer in the routing lookup tree in a specified hardware memory.

The above devices may be installed in an existing NP. The above software algorithm module, the update control module and the lookup module may be implemented by a Central Processing Unit (CPU).

The above are only the embodiments of the disclosure and are not intended to limit the scope of the claims of the disclosure.

What is claimed is:

1. A method for updating a routing lookup tree, comprising:
   determining, by a Network Processor (NP), a layer update indication table and node update information according to updated entries, when determining that a routing lookup tree needs to be updated; and
   selecting, by the NP, in sequence a layer from the routing lookup tree as a current layer according to levels of layers, and
   if determining, by the NP, that the current layer needs to be updated according to the layer update indication table, then locking, by the NP, a previous layer of the current layer in the routing lookup tree, synchronizing, by the NP, the node update information to the current layer in the routing lookup tree, until determining, by the NP, that the current layer is a last layer needing to be updated according to the layer update indication table, and then ending, by the NP, the update of the routing lookup tree
   wherein, the locking means stopping the previous layer from sending a lookup key value to the current layer.

2. The method according to claim 1, wherein determining, by the NP, the layer update indication table and the node update information according to the updated entries comprises:
   calculating, by the NP, to obtain a new routing lookup table according to routing entries to be updated;
   obtaining, by the NP, the layer update indication table and the node update information according to the new routing lookup table.

3. The method according to claim 2, wherein obtaining, by the NP, the layer update indication table and the node update information according to the new routing lookup table comprises:
   comparing, by the NP, the new routing lookup table with an original routing lookup table saved in the NP, and checking, by the NP, each layer in sequence to judge whether a node is needed to be added to or deleted from a layer; if needed, then setting, by the NP, an update layer level mark of the layer as 1 at a corresponding location of the layer update indication table, and writing, by the NP, node information modified in the layer as the node update information; if not needed, then setting, by the NP, the update layer level mark of the layer as 0 at a corresponding location of the layer update indication table, until obtaining, by the NP, the layer update indication table composed of update layer level marks of all the layers.

4. The method according to claim 1, wherein locking, by the NP, the previous layer of the current layer in the routing lookup tree, and synchronizing, by the NP, the node update information to the current layer in the routing lookup tree comprises:
   after locking, by the NP, the previous layer of the current layer, judging whether on-going lookup has been completed in the current layer; if completed, then updating, by the NP, a node needing to be updated in the current layer according to an updated node table; if not completed, then continuing, by the NP, judging whether the on-going lookup has been completed in the current layer.

5. The method according to claim 4, wherein determining, by the NP, that the current layer is the last layer needing to be updated comprises:
   judging, by the NP, whether the current layer is the last layer needing to be updated according to the layer update indication table; if the current layer is the last layer, then ending, by the NP, the processing flow;
   if the current layer is not the last layer, then starting, by the NP, judging from the current layer whether there is any layer needing to be updated according to the layer update indication table; if there is a layer needing to be updated, then locking, by the NP, the previous layer of the current layer in the routing lookup tree, and synchronizing, by the NP, the node update information to the current layer; if there is no layer needing to be updated, then continuing, by the NP, judging whether the current layer is the last layer needing to be updated according to the layer update indication table.

6. The method according to claim 1, wherein determining, by the NP, that the current layer is the last layer needing to be updated comprises:
   judging, by the NP, whether the current layer is the last layer needing to be updated according to the layer update indication table; if the current layer is the last layer, then ending, by the NP, the processing flow;
   if the current layer is not the last layer, then starting judging, by the NP, from the current layer whether there is any layer needing to be updated according to the layer update indication table; if there is a layer needing to be updated, then locking, by the NP, the previous layer of the current layer in the routing lookup tree, and synchronizing, by the NP, the node update information to the current layer; if there is no layer needing to be updated, then continuing, by the NP, judging whether the current layer is the last layer needing to be updated according to the layer update indication table.

7. A device for updating a routing lookup tree, comprising a processor configured to be capable of executing programmed instructions comprising:
   when determining that a routing lookup tree needs to be updated, determining a layer update indication table and node update information according to updated entries;
   selecting in sequence a layer from the routing lookup tree as a current layer according to levels of layers;
   if determining that the current layer needs to be updated according to the layer update indication table, then locking a previous layer of the current layer in the routing lookup tree, synchronizing the node update information to the current layer in the routing lookup tree, until determining that the current layer is a last layer needing to be updated according to the layer update indication table, and then ending the update of the routing lookup tree;

wherein, the locking means stopping the previous layer from sending a lookup key value to the current layer.

8. The device according to claim 7, wherein determining the layer update indication table and the node update information according to the updated entries comprises:

calculating to obtain a new routing lookup table according to routing entries to be updated, and obtaining the layer update indication table and the node update information according to the new routing lookup table.

9. The device according to claim 8, wherein obtaining the layer update indication table and the node update information according to the new routing lookup table comprises;

comparing the new routing lookup table with an original routing lookup table saved in a Network Processor (NP), and checking each layer in sequence to judge whether a node is needed to be added to or deleted from a layer; if needed, then setting an update layer level mark of the layer as 1 at a corresponding location of the layer update indication table, and writing node information modified in the layer as the node update information; if not needed, then setting the update layer level mark of the layer as 0 at a corresponding location of the layer update indication table, until obtaining the layer update indication table composed of update layer level marks of all the layers.

10. The device according to claim 7, wherein locking the previous layer of the current layer in the routing lookup tree, and synchronizing the node update information to the current layer in the routing lookup tree comprises:

after locking the previous layer of the current layer, judging whether on-going lookup has been completed in the current layer; if completed, then updating a node needing to be updated in the current layer according to an updated node table; if not completed, then continuing judging whether the on-going lookup has been completed in the current layer.

11. The device according to claim 10, wherein determining that the current layer is the last layer needing to be updated comprises:

judging whether the current layer is the last layer needing to be updated according to the layer update indication table; if the current layer is the last layer, then ending operation; if the current layer is not the last layer, then starting judging from the current layer whether there is any layer needing to be updated according to the layer update indication table; if there is a layer needing to be updated, then locking the previous layer of the current layer in the routing lookup tree, and synchronizing the node update information to the current layer; if there is no layer needing to be updated, then continuing judging whether the current layer is the last layer needing to be updated according to the layer update indication table.

* * * * *

UNITED STATES PATENT AND TRADEMARK OFFICE
CERTIFICATE OF CORRECTION

| | | |
|---|---|---|
| PATENT NO. | : 9,491,100 B2 | Page 1 of 1 |
| APPLICATION NO. | : 14/436539 | |
| DATED | : November 8, 2016 | |
| INVENTOR(S) | : Zhenlin Yan and Zhihai Hu | |

It is certified that error appears in the above-identified patent and that said Letters Patent is hereby corrected as shown below:

On the Title Page

Attorney, Agent or Firm Should Read: Oppedahl Patent Law Firm LLC

Signed and Sealed this
Twelfth Day of May, 2020

Andrei Iancu
*Director of the United States Patent and Trademark Office*